United States Patent
Ku et al.

(10) Patent No.: US 8,317,362 B2
(45) Date of Patent: Nov. 27, 2012

(54) LED LAMP

(75) Inventors: Chin-Long Ku, Taipei Hsien (TW); Ju Li, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/786,349

(22) Filed: May 24, 2010

(65) Prior Publication Data
US 2011/0115414 A1     May 19, 2011

(30) Foreign Application Priority Data
Nov. 17, 2009    (CN) .......................... 2009 1 0309853

(51) Int. Cl.
*F21V 1/00*      (2006.01)

(52) U.S. Cl. ......................... 362/238; 362/240; 362/802

(58) Field of Classification Search ................... 362/216, 362/235, 238, 240, 244, 249, 326, 335, 800; 315/185 R, 313
See application file for complete search history.

(56) References Cited

U.S. PATENT DOCUMENTS

| | | | |
|---|---|---|---|
| 6,905,228 B1* | 6/2005 | Takeyasu et al. | 362/237 |
| 7,416,312 B1* | 8/2008 | McDermott | 362/216 |
| 2003/0147239 A1* | 8/2003 | Galli | 362/205 |
| 2008/0151542 A1* | 6/2008 | Liddle | 362/240 |
| 2009/0316412 A1* | 12/2009 | Yeh et al. | 362/285 |
| 2009/0323333 A1* | 12/2009 | Chang | 362/240 |

\* cited by examiner

*Primary Examiner* — Tung X Le
(74) *Attorney, Agent, or Firm* — Altis Law Group, Inc.

(57) ABSTRACT

A light emitting diode (LED) lamp includes a lamp body, an LED module mounted on an end of the lamp body and a switching member mounted on the lamp body. The LED module has LEDs facing outwards. The switching member is capable of switching the LED lamp between N type of working modes including modes $I_1, I_2, \ldots I_n$. The LEDs are connected with each other in series into an LED string. The modes $I_1, I_2, \ldots I_n$ correspond to n different connecting points of the LED string.

16 Claims, 3 Drawing Sheets

LED LAMP

BACKGROUND

1. Technical Field

The disclosure relates to a light emitting diode (LED) lamp, and particularly to an LED lamp having an adjustable illumination intensity.

2. Description of Related Art

With the continuing development of scientific technology, LEDs have been widely used for illumination due to their high brightness, long life-span, and wide color gamut.

An LED lamp is a type of solid-state lighting device that utilizes LEDs as a source of illumination.

A conventional LED lamp generally comprises a lamp cover and a plurality of LEDs attached to an inner wall of the lamp cover. However, the LED lamp can only be assembled in a predetermined form with its illumination power restricted to a fixed value. A problem is that the conventional LED lamp fails to provide an adjustable illumination power and illumination intensity of light emitted from the LEDs. So the conventional LED lamp fails to satisfy a requirement that an illumination power and an illumination intensity of the LED lamp are variable, which may be required for some applications to save energy or create a comfortable environment.

What is needed, therefore, is an LED lamp which can overcome the above-mentioned disadvantages.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
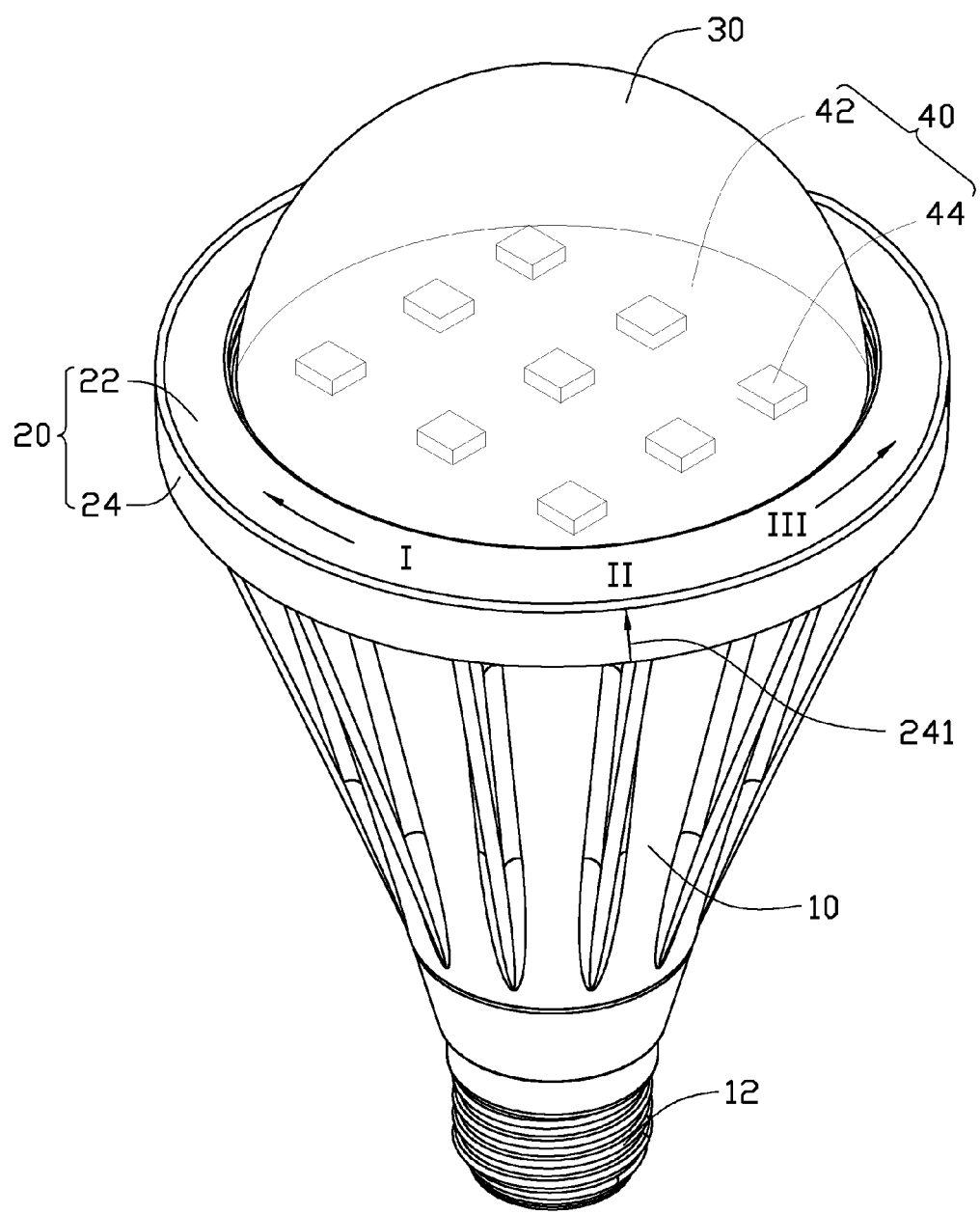
FIG. 1 is a perspective view of a light emitting diode (LED) lamp in accordance with a first embodiment of the disclosure.

Referring to FIG. 1, a light emitting diode (LED) lamp in accordance with a first embodiment is illustrated. The LED lamp is configured for being used indoors or outdoor to provide illumination in different powers and intensities. The LED lamp comprises a lamp body 10, a switching member 20 mounted on a periphery of a top of the lamp body 10, a lamp cover 30 mounted on the top of the lamp body 10 with an edge thereof adjacent to the switching member 20 and an LED module 40 mounted on a central portion of the top of the lamp body 10 and facing the lamp cover 30. The lamp cover 30 covers the LED module 40.

The lamp body 10 has a shape of a cone or funnel in this embodiment; though, the lamp body 10 is not restricted to this shape and can have other shapes such as a cylinder in another embodiment. A lamp holder 12 is connected to a small end of the lamp body 10, which is located at a bottom of the lamp body 10. The lamp holder 12 is configured for being fixed in a lamp base or socket (not shown) to mount the LED lamp on the lamp base or socket when in use. The lamp holder 12 is configured as a cap of a standard incandescent light bulb so that the LED lamp of the present disclosure can replace a standard incandescent light bulb or a standard compact bulb. The lamp holder 12 is formed with a thread thereon.

The lamp cover 30 has a shape of a dome, is fixed on the top of the lamp body 10 and plumps upwardly from the top of the lamp body 10. The lamp cover 30 is transparent and made of glass or plastic.

The LED module 40 comprises a printed circuit board 42 and a plurality of LEDs 44 mounted on the printed circuit board 42. In this embodiment, the number of the LEDs 44 is nine. The printed circuit board 42 has a configuration of a circular plate, is snugly mounted on the top of lamp body 10 and is wholly covered by the lamp cover 30. The top of the lamp body 10 is larger than the bottom of the lamp body 10. The LEDs 44 are mounted on a top side of the printed circuit board 42 and face directly to the lamp cover 30 so that light emitted from LEDs 44 can all directly travel through the lamp cover 30 to an outside of the LED lamp.

Figure 2:
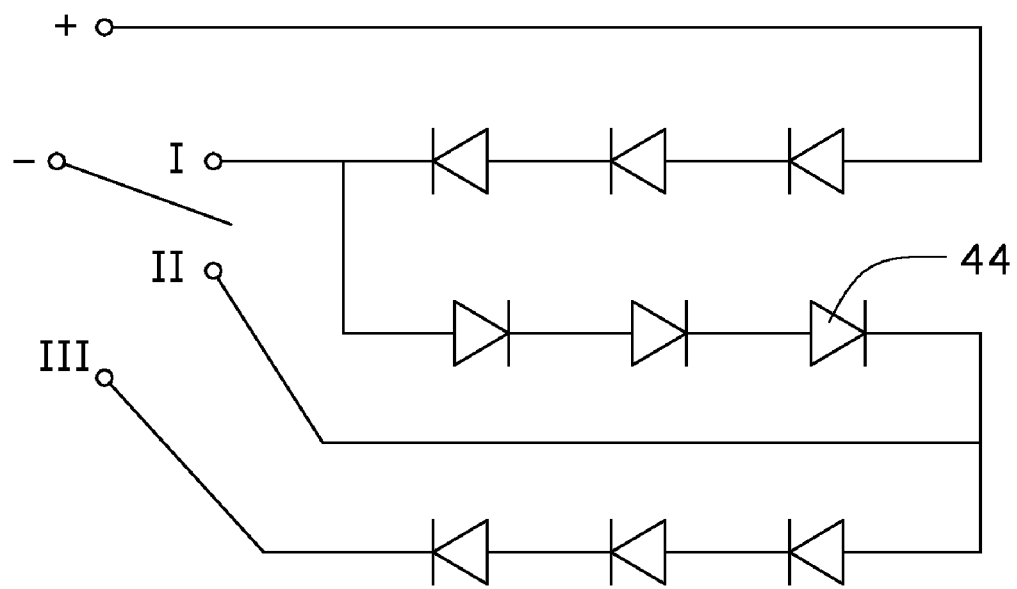
FIG. 2 is a schematic view of a circuit used in the LED lamp of FIG. 1.

Referring also to FIG. 2, a circuit of the LED lamp is provided. In this circuit, the LEDs 44 are connected in series into an LED string. An anode (not labeled) of an outmost LED 44 is adopted for connecting with a positive pole (not labeled) of a power source (not shown). The outmost LED 44 is regarded as the first LED 44. Following the connecting sequence of the LEDs 44, a cathode of the third LED 44 is connected to a connecting point I, a cathode of the sixth LED 44 is connected to a connecting point II and a cathode of the ninth LED is connected to a connecting point III. The connecting points II and III are formed between the connecting point III and the anode of the outmost (first) LED 44. A negative pole (not labeled) of the power source is selectively connected to one of the connecting points I, II and III.

The switching member 20 is mounted around the top of the lamp body 10 and comprises an annular fixing part 22 and an annular operating part 24 rotatably mounted around the fixing part 22. The fixing part 22 is fixed on the periphery of the top of the lamp body 10 and extends outwardly and horizontally therefrom. The operating part 24 is adjacent to the fixing part 22 and rotatable relative to the fixing part 22 to adjust an outputting power and a light intensity of the LED lamp.

Three labels I, II, III are formed on the fixing part 22. A portion of the fixing part 22 corresponding to one of the labels I, II, and III forms an electrode connecting with a corresponding one of the connecting points I, II, and III. An arrow 241 is labeled on the operating part 24. A portion of the operating part 24 corresponding to the arrow 241 forms as an electrode connecting with the negative pole of the power source. Accordingly, one of the electrodes corresponding to the labels I, II, and III is selectively to electrically couple with the electrode corresponding to the arrow 241 when the operating part 24 is rotated relative to the fixing part 22 to cause the arrow 241 to aim at a corresponding one of the labels I, II, and III. In other embodiments, the connecting points I, II, and III are directly disposed on the fixing part 22 corresponding to the labels I, II, and III.

The LED lamp can be selected to work in different modes including mode I, mode II and mode III, by rotating the operating part 24 of the switching member 20 to make the arrow 241 labeled on the operating part 24 aim at different labels "I", "II" and "III" labeled on the fixing part 22 (shown in FIG. 1). Corresponding to different working modes, quantities of the LEDs 44 of the LED lamp at work (being activated) are also different. For example, when the arrow is turned to aim at the label "I", the negative pole of the power source is connected to the connecting point I (shown in FIG. 2) to make three of the LEDs 44 be in closed loop of the circuit and at work; when the arrow is turned to aim at the label "II", the negative pole of the power source is connected to the connecting point II (shown in FIG. 2) to make ones of the LEDs 44 be in closed loop of the circuit and at work; when the arrow is turned to aim at the label "III", the negative pole of the power source is connected to the connecting point III (shown in FIG. 2) to make nine (all) of the LEDs 44 be in closed loop of the circuit and at work. That is, three of the LEDs 44 are turned on in mode I; six of the LEDs 44 are turned on in mode II; nine (all) of the LEDs 44 are turned on in mode III.

Figure 3:
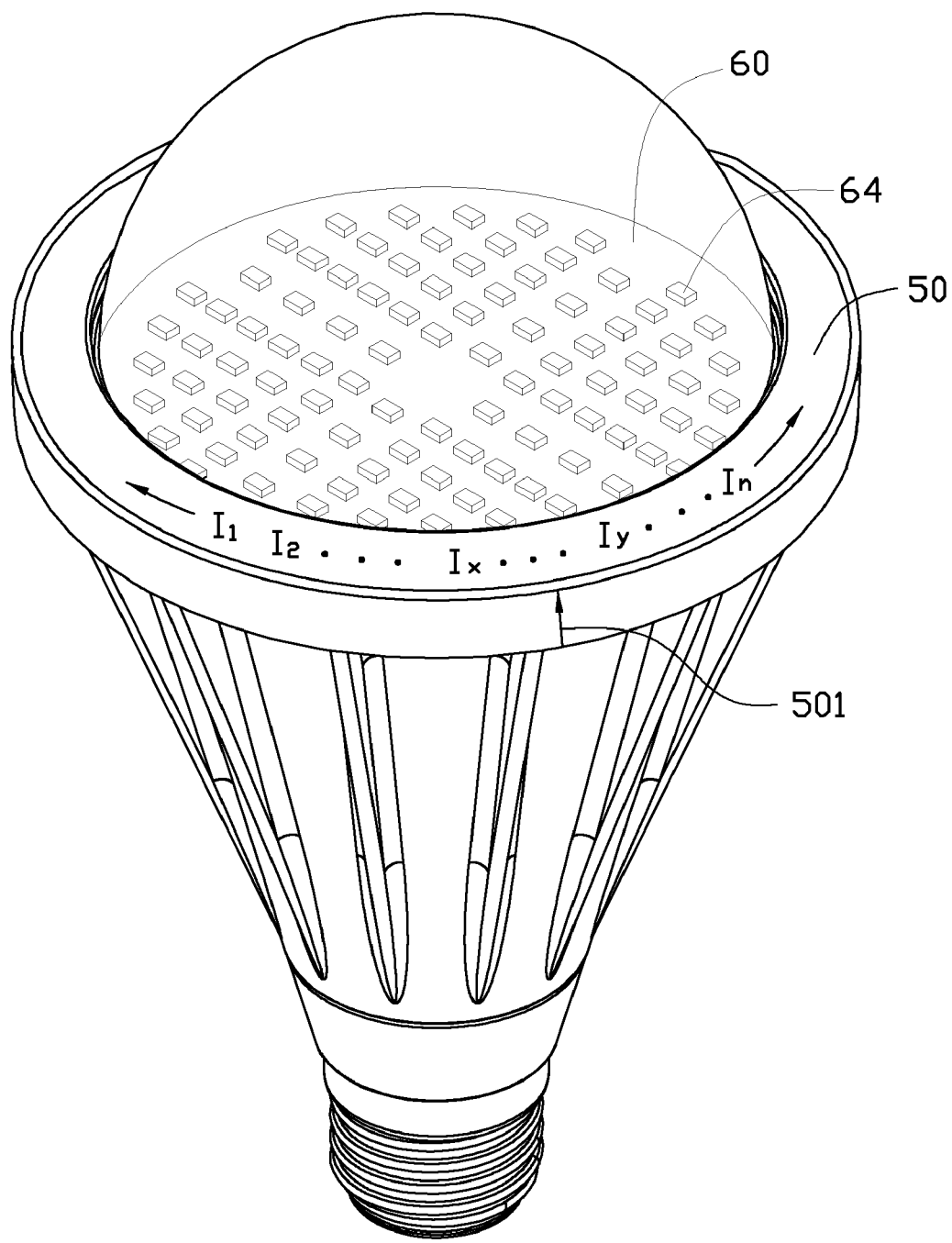
FIG. 3 is a perspective view of an LED lamp in accordance with a second embodiment of the disclosure.

Referring to FIG. 3, an LED lamp in accordance with a second embodiment is illustrated. The LED lamp can be selected to work in N type of modes including mode $I_1$, $I_2$, ... $I_n$ by rotating an operating part of a switching member 50 thereof to make an arrow 501 labeled on the operating part aim at different labels "$I_1$", "$I_2$", ... "$I_n$" labeled on the fixing part. Corresponding to different working modes, quantities of the LEDs 44 of the LED lamp at work are also different. That is, when $Q_1$ ones of the LEDs 44 are turned on in mode $I_1$, a corresponding outputting power of the LED lamp is $W_1$; when $Q_x$ ones of the LEDs 44 are turned on in mode $I_x$, a corresponding outputting power of the LED lamp is $W_x$; when $Q_y$ ones of the LEDs 44 are turned on in mode $I_y$, a corresponding outputting power of the LED lamp is $W_y$; when $Q_n$ ones of the LEDs 44 are turned on in mode $I_n$, a corresponding outputting power of the LED lamp is $W_n$. Here, if x>y, then $Q_x>Q_y$ and $W_x>W_y$; in contrary, if x<y, then $Q_x<Q_y$ and $W_x<W_y$.

In use of the LED lamp, the LED lamp can be easily adjusted to provide with illumination light in different powers and intensities to satisfy different requirements in practice, by only simply rotating the operating part of the switching member 20/50 thereof.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A light emitting diode (LED) lamp, comprising:
a lamp body;
an LED module mounted on the lamp body and comprising a plurality of LEDs connected with each other in series into an LED string; and
a switching member mounted on the lamp body, the switching member being operable to select the LED lamp to work in N type of modes including modes $I_1$, $I_2$, ... $I_n$ which are corresponding to n different connecting points of the LED string,
wherein n is an integer number;
wherein in mode $I_x$, $Q_x$ ones of the LEDs are turned on, a corresponding outputting power of the LED lamp is $W_x$; in mode $I_y$, $Q_y$ ones of the LEDs are turned on, a corresponding outputting power of the LED lamp is $W_y$; if x>y, then $Q_x>Q_y$ and $W_x>W_y$; and, if x<y, then $Q_x<Q_y$ and $W_x<W_y$, wherein x, y are integer numbers;
wherein the switching member comprises a fixing part and an operating part, the operating part being electrically connected with a negative pole of a power source and turnable to connect with one of different connecting points $I_1$, $I_2$, ... $I_n$ disposed on the fixing part and electrically connected to the n different connecting points of the LED string.

2. The LED lamp of claim 1, wherein the operating part is rotatable to connect to one of the connecting points $I_1$, $I_2$, ... $I_n$ to select the LED lamp to work in a corresponding mode.

3. The LED lamp of claim 2, wherein each of the fixing part and the operating part is annular and fixed on a periphery of a top of the lamp body.

4. The LED lamp of claim 3, wherein the fixing part extends outwardly and horizontally from the periphery of the top of the lamp body, and the operating part is adjacent to the fixing part and rotatable relative to the fixing part.

5. The LED lamp of claim 1, wherein the lamp body has a shape of a cone or funnel with a top and a bottom smaller than the top.

6. The LED lamp of claim 5, wherein the LED module is mounted on the top of the lamp body and comprises a circular printed circuit board snugly mounted in the top of the lamp body and on which the LEDs are mounted.

7. The LED lamp of claim 6, further comprising a lamp cover of a shape of a dome, wherein the lamp cover humps up from the top of the lamp body and wholly covers the LED module therein.

8. The LED lamp of claim 6, wherein the lamp body has a lamp holder at the bottom of the lamp body, which has a thread thereon for connecting with a lamp socket.

9. A light emitting diode (LED) lamp, comprising:
a lamp body;
an LED module mounted on an end of the lamp body and comprising a plurality of LEDs facing outwards, the LEDs being connected with each other in series into an LED string; and
a switching member mounted on the lamp body and switching the LED lamp between N type of working modes including modes $I_1$, $I_2$, ... $I_n$ which are corresponding to n different connecting points of the LED string, wherein n is an integer number;
wherein in mode $I_x$, $Q_x$ ones of the LEDs are turned on, a corresponding outputting power of the LED lamp is $W_x$; in mode $I_y$, $Q_y$ ones of the LEDs are turned on, a corresponding outputting power of the LED lamp is $W_y$; if x>y, then $Q_x>Q_y$ and $W_x>W_y$; and , if x<y, then $Q_x<Q_y$ and $W_x<W_y$, wherein x,y are integer numbers:
wherein the switching member comprises a fixing part and an operating part, the operating part being electrically connected with a negative pole of a power source and turnable to connect one of different connecting points $I_1$, $I_2$, ... $I_n$ disposed on the fixing part and electrically connected to the n different connecting points of the LED string.

10. The LED lamp of claim 9, wherein the operating part is rotatable to connect to one of the connecting points $I_1$, $I_2$, ... $I_n$ to select the LED lamp to work in a corresponding mode.

11. The LED lamp of claim 10, wherein each of the fixing part and the operating part is annular and fixed on a periphery of the end of the lamp body.

12. The LED lamp of claim 11, wherein the fixing part extends outwardly and horizontally from the periphery of the end of the lamp body, and the operating part is adjacent to the fixing part and rotatable relative to the fixing part.

13. The LED lamp of claim 9, wherein the lamp body has a shape of a cone or funnel, another end of the lamp body opposite to the end being smaller than the end.

14. The LED lamp of claim 13, wherein the LED module comprises a circular printed circuit board snugly mounted in the end of the lamp body, the LEDs being mounted on the printed circuit board.

15. The LED lamp of claim 14, further comprising a lamp cover of a shape of a dome, wherein the lamp cover humps up from the end of the lamp body and wholly covers the LED module therein.

16. The LED lamp of claim 14, wherein the lamp body has a lamp holder at the other end of the lamp body, the lamp holder forming a thread thereon.

* * * * *